Patented Jan. 19, 1932

1,841,432

UNITED STATES PATENT OFFICE

TRESPER CLARKE, OF ATLANTA, GEORGIA, ASSIGNOR TO NUNNALLY COMPANY, OF ATLANTA, GEORGIA, A CORPORATION OF GEORGIA

PROCESS OF COLORING AND FLAVORING SUGAR AND PRODUCTS RESULTING THEREFROM

No Drawing.   Application filed July 15, 1929.   Serial No. 378,566.

This invention relates to processes of coloring and flavoring sugar, and to the products resulting from the practice of these processes.

The main object of the invention is to treat sugar, in granulated or block form, with flavoring materials and colors corresponding to the flavors, so as to provide sugars, preferably in cube form, which can be identified by mere inspection as possessing certain desirable characteristic flavors. For example, cubes impregnated with orange flavors, are orange colored; lemon flavored cubes, are lemon colored; and mint flavored cubes will have the familiar mint green color.

It is intended that various colored combinations of these colored and flavored cubes be enclosed in a suitable transparent wrapper so that purchasers can determine by inspection just what particular flavored "sweeteners" they are buying. They are primarily intended for sweetening and flavoring tea, either cold or hot, as it is common to flavor this beverage with orange, lemon or similar fruit juices. As the coloring of these sweeteners corresponds to their flavors, it is a very easy matter for the user to regulate the flavor of his beverage by selecting "sweeteners" corresponding in color to the desired flavor or combination of flavors. The "sweeteners" may, obviously, be used as confections. However they may be used, their color corresponds to and is intended to indicate their flavors.

The invention may be practiced by several methods. However, there are two preferred methods of making these "sweeteners"; and these will now be set forth in detail.

*First method*

In the first method, I prefer to dip sugar in domino block form into a solvent containing in solution, the desired flavor, citric or tartaric acid and coloring matter corresponding to the flavor.

Preferably the solvent consists of two volatile liquids—about one part of ethyl alcohol to four parts of ethyl acetate. In this solvent, I dissolve either .2% of citric acid, or .12% of tartaric acid. To this acid solution is added flavoring in the form of terpeneless orange, lime, lemon, or mandarin, or spearmint oils; or orange, lime, lemon or mandarin oils; which are listed in the United States and British Pharmacopœias. These flavors will, of course, be added in proportions corresponding to the desired strength of the flavor.

For coloring the cubes or dominos of sugar, I use the organic coloring matters known by the trade-names as, tartrazine; 80 Ponceau 3R; F. C. F. fast green, or any suitable colors approved as food colors by the U. S. Bureaus of Chemistry and Standards in the Departments of Agriculture and Commerce, respectively.

The yellow coloring, tartrazine, is benzene-azo-pyrazalone-carboxy-disulphonic acid; F. C. F. fast green is para-hydroxy-benzaldehyde-orthosulphonic acid; and Ponceau 3R, is a combination of cumedine and R-salt described in Bulletin 147, (1912) of the Bureau of Chemistry.

These various colors or any desired combinations of them are used in 5% aqueous solutions to color the previously prepared acid-oil solvent solutions previously described. For lemon-sugar, straight tartrazine is used; for orange, a combination of tartrazine and ponceau is used, and for lime and mint, various combinations of tartrazine and fast green are used. The colored 5% aqueous solutions are added to the acid-flavored solvent in from 2 cc. to 10 cc. for every 3 liters of the alcohol-acetate solvent.

Sugar cubes or dominos are then dipped in this colored solution and allowed to remain therein for a short time. Then the treated cubes or dominos are removed from the colored and flavored solution and spread out to dry. This solvent does not dissolve the sugar; but is does deposit the flavoring and coloring matter on the sugar without rendering it injurious or imparting to it any objectionable odor.

*Second method*

In this preferred method, I use a syrup of sucrose instead of the acetate-alcohol solvent used in the first method.

When sucrose is cooked with water to a temperature of 105° C. the solution contains a definite percentage of sucrose. When this cooked solution is allowed to cool the saturation point of solution is approached in the temperature range between 25° and 35° C. At some temperature in this range the saturation point is reached; and further cooling causes super-saturation, and consequently renders the solution unable to dissolve more sucrose.

Any sucrose in the solid phase which has interfacial contact with this cooled supersaturated solution usually adsorbs some of the solute. If it be of a porous nature, like domino or granulated sugar, it will also absorb much of the solution. On drying sucrose, the solute crystallizes on and in the solid phase.

In this second method, the sucrose solution acts as a solvent instead of the alcohol-acetate mixture used in the first method. While the cooked sucrose solution is cooling from the 105° C. temperature, the citric (.2%) or tartaric (.12%) acid is added to the cooked sucrose anywhere in the 40° to 60° C. temperature range. The flavors and colors, however, should be added while the temperature of the cooked and cooling sucrose solution is above 60° C.

The same colors are used as in the first method, and the flavors may be obtained by adding the desired flavoring oils as in the first method. However, in this process, I prefer to use the desiccated juices of the corresponding citrus fruits in such quantities, and with such a quantity of water as solvent, that the saturation temperature point of the cooked syrup is not reduced below the lower temperature of the range already mentioned 25° to 35° C.

Preferably the syrup solution is poured over domino or cube sugar, arranged in trays, until they become thoroughly soaked and wet with the syrup. Then the cubes or dominos are removed from the trays, drained and spread out to evaporate the solvent and dry them.

The product in cube or domino block form constitutes a very convenient means and sanitary means for adding flavoring to beverages ordinarily sweetened by the addition of sugar. The coloring not only adds to the attractiveness of the product, but also serves to indicate the flavor embodied in the product, and which will be released therefrom by the mere additon to the beverage of the cube or domino sugar in the ordinary manner.

What I claim is:

1. The process of flavoring sugar which consists in cooking a solution of sucrose in water at a temperature of about 105° C., cooling the cooked solution until it becomes supersaturated, dissolving a small percentage of an organic acid in the cooling solution before it reaches the supersaturation temperature, dissolving flavoring matter in said cooling solution before the supersaturation point, wetting and soaking the sugar with the flavored solution, and then evaporating the solvent from the treated sugar to deposit the several solutes thereon.

2. The process of flavoring sugar which consists in cooking a solution of sucrose in water at a temperature of about 105° C., cooling the cooked solution until it becomes supersaturated, dissolving a small percentage of an organic acid in the cooling solution before it reaches the supersaturation temperature, dissolving flavoring and coloring matters in said cooling solution before the supersaturation point, wetting and soaking the sugar with the flavored and colored solution, and then evaporating the solvent from the treated sugar to deposit the several flavoring and coloring solutes thereon.

3. The process of flavoring sugar which consists in cooking a solution of sucrose in water at a temperature of about 105° C., cooling the cooked solution until it becomes supersaturated, dissolving a small percentage of an organic acid in the cooling solution before it reaches the supersaturation temperature, dissolving desiccated fruit juices in the cooling solution before the supersaturation point, wetting and soaking the sugar in this final solution, and then evaporating the solvent from the treated sugar to deposit the fruit juices thereon.

4. The process of flavoring and coloring sugar which consists in cooking a solution of sucrose in water at a temperature of about 105° C., cooling the cooked solution until it becomes supersaturated, dissolving a small percentage of an organic acid in the cooling solution before it reaches the supersaturation temperature, dissolving desiccated fruit juices and organic coloring matter in the cooling solution before the supersaturation point thereof, wetting and soaking the sugar in this final supersaturated solution, and then evaporating the solvent from the treated sugar to deposit the fruit juices and coloring matter thereon.

5. The process of flavoring and coloring sugar which consists in cooking a solution of sucrose in water at a temperature of about 105° C., cooling the cooked solution until it becomes supersaturated in a temperature range between 25° to 35° C., dissolving a small percentage of tartaric acid in the cooling solution while the temperature thereof is between 45° and 60° C., dissolving fruit juices and coloring matter in the cooling solution while the temperature thereof is above 60° C., cooling the last solution to the supersaturation temperature, soaking and wetting the sugar in the supersaturated solution, and then evaporating the solvent from the soaked and wet sugar to deposit the several solutes thereon.

In testimony whereof I affix my signature.

TRESPER CLARKE.